(12) United States Patent
Morgan (10) Patent No.: US 8,589,072 B2
(45) Date of Patent: Nov. 19, 2013

(54) OPTIMAL COMBINATION OF SATELLITE NAVIGATION SYSTEM DATA AND INERTIAL DATA

(75) Inventor: Kenneth Steven Morgan, St. Petersburg, FL (US)

(73) Assignee: Honeywell International, Inc., Morristown, NJ (US)

( * ) Notice: Subject to any disclaimer, the term of this patent is extended or adjusted under 35 U.S.C. 154(b) by 181 days.

(21) Appl. No.: 13/446,093

(22) Filed: Apr. 13, 2012

(65) Prior Publication Data

US 2012/0265440 A1 Oct. 18, 2012

Related U.S. Application Data

(60) Provisional application No. 61/475,078, filed on Apr. 13, 2011.

(51) Int. Cl.
*G01C 21/00* (2006.01)

(52) U.S. Cl.
USPC .......................................................... 701/472

(58) Field of Classification Search
USPC .......................................................... 701/472
See application file for complete search history.

(56) References Cited

U.S. PATENT DOCUMENTS

| | | | | |
|---|---|---|---|---|
| 6,052,647 | A * | 4/2000 | Parkinson et al. | 701/23 |
| 6,424,914 | B1 * | 7/2002 | Lin | 701/470 |
| 6,496,778 | B1 * | 12/2002 | Lin | 701/470 |
| 7,151,486 | B2 * | 12/2006 | Kim | 342/357.59 |
| 7,643,939 | B2 * | 1/2010 | Zeng et al. | 701/480 |
| 7,860,617 | B1 * | 12/2010 | Gaylor et al. | 701/13 |
| 2003/0132878 | A1 * | 7/2003 | Devereux et al. | 342/357.06 |
| 2006/0074558 | A1 * | 4/2006 | Williamson et al. | 701/213 |
| 2007/0213933 | A1 * | 9/2007 | Zeng et al. | 701/220 |
| 2008/0077325 | A1 * | 3/2008 | Bye et al. | 701/220 |
| 2009/0248225 | A1 * | 10/2009 | Stecko et al. | 701/3 |
| 2010/0036612 | A1 * | 2/2010 | Vance | 701/220 |
| 2012/0065883 | A1 * | 3/2012 | Williamson | 701/501 |

OTHER PUBLICATIONS

Bierman, Gerald J., "Factorization Methods for Discrete Sequential Estimation", 1977, pp. 53 76-81, 124-129, Publisher: Academic Press, Published in: Pasadena, CA, US.

* cited by examiner

*Primary Examiner* — Thomas Tarcza
*Assistant Examiner* — Alex C Dunn
(74) *Attorney, Agent, or Firm* — Fogg & Powers LLC (57) ABSTRACT

A navigation system comprises at least one processor, a satellite navigation receiver operatively coupled to the processor and configured to receive a plurality of navigation signals from one or more navigation satellites, and an inertial measurement unit operatively coupled to the processor and configured to generate inertial measurement data. An extended Kalman filter is configured to receive the plurality of navigation signals and the inertial measurement data. A processor readable storage medium includes instructions executable by the processor to combine the plurality of satellite signals with the inertial measurement data in the extended Kalman filter to generate a navigation solution. The plurality of navigation signals includes L1 pseudorange measurements, L2 pseudorange measurements, L1 accumulated carrier phase measurements, and L2 accumulated carrier phase measurements.

20 Claims, 10 Drawing Sheets

OPTIMAL COMBINATION OF SATELLITE NAVIGATION SYSTEM DATA AND INERTIAL DATA

This application claims the benefit of priority to U.S. Provisional Application No. 61/475,078, filed on Apr. 13, 2011, the disclosure of which is incorporated by reference.

GOVERNMENT RIGHTS

This invention was made with Government support under Contract No. 4200308266 awarded by Raytheon. The Government may have certain rights in the invention.

BACKGROUND

Earth relative navigation can be achieved with the aid of a satellite navigation system. Several satellite navigation systems exist or are in the process of being deployed including the Global Positioning System (GPS), the Global Navigation Satellite System (GLONASS) system, the Beidou navigation system, and the Galileo positioning system.

These satellite navigation systems include a plurality of orbiting satellites that transmit signals that can be received and processed by a satellite navigation receiver in order to determine a relative earth location. Often satellites in a satellite navigation system transmit multiple signals on different frequencies. These signals on different frequencies are often referred to by the letter "L" followed by a number to differentiate different frequencies. For example, a first signal on a first carrier frequency from a first satellite is often referred to as an "L1" signal from that satellite and a second signal on a second carrier frequency from the first satellite is often referred to as an "L2" signal.

Conventional navigation systems have typically processed L1 iono corrected pseudorange and L1 delta range signals. Delta range is the difference in accumulated phase from one GPS measurement epoch to the next. Accumulated carrier phase data is often used for relative kinematic GPS solutions but is not often used for absolute earth relative navigation.

An Extended Kalman filter (EKF) can be used to obtain navigation information from the satellite signals. A baseline EKF can process three sets of measurement data from each satellite. These sets of measurement data can include L1 pseudorange, L1 delta range, and L2 delta range. The baseline EKF accounts for errors in the measurement data through the use of a combination of measurement error states with process noise and measurement observation noise. For example, the baseline EKF can maintain 10 pseudorange bias states, 10 delta range bias states, and 2 receiver clock states to model GPS measurement errors. Ten states were chosen because the baseline EKF was designed for a receiver that had 12 channels. Ten channels are used to maintain tracking and two channels are allocated to iono compensation and satellite management.

The baseline EKF can allocate measurement errors according to the following: space and control segment errors and troposphere errors are allocated to pseudorange bias states; residual ionospheric delay (after computation) errors and multipath errors are allocated to pseudorange measurement noise; receiver noise and tracking errors are allocated to pseudorange measurement noise and delta range measurement noise; residual ionospheric delay rate errors are allocated to delta range bias states; space and control segment rate errors are allocated to delta range process noise; and receiver clock errors are allocated to clock bias state and clock frequency state.

SUMMARY

A navigation system comprises at least one processor, a satellite navigation receiver operatively coupled to the processor and configured to receive a plurality of navigation signals from one or more navigation satellites, and an inertial measurement unit operatively coupled to the processor and configured to generate inertial measurement data. An extended Kalman filter is configured to receive the plurality of navigation signals and the inertial measurement data. A processor readable storage medium includes instructions executable by the processor to combine the plurality of satellite signals with the inertial measurement data in the extended Kalman filter to generate a navigation solution. The plurality of navigation signals includes L1 pseudorange measurements, L2 pseudorange measurements, L1 accumulated carrier phase measurements, and L2 accumulated carrier phase measurements.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

The present approach provides a method and system for optimally combining all available GPS data including L1 pseudorange, L1 accumulated carrier phase, L2 pseudorange, and L2 accumulated phase, with inertial data including inertial delta velocity and delta angle information, in a manner that creates an extremely accurate absolute earth relative navigation solution. The present approach meets the need for an accurate navigation solution by processing all available GPS data and inertial data in an extended Kalman filter. The method and system are unique and different due to the selection of measurements and Kalman filter states. Accuracy is optimized due to this measurement and state selection.

In the present implementation of an extended Kalman filter, a navigation path is formed by integrating inertial data along the navigation path. GPS measurements are processed by linearizing about this navigation path. The solution is an extended Kalman filter because the inertial data and the navigation path are corrected by the Kalman filter.

In one embodiment, an integrated GPS/INS navigation system is provided that generates a blended navigation solution. The navigation system can provide continuous outputs for a pure inertial navigation solution (INS), a GPS navigation solution, a blended GPS/INS navigation solution, and a smooth solution. The navigation states can include three position, three velocity, and three attitude error states. Pressure aiding can be employed, which requires some type of pressure bias modeling. A bias and scale factor state can also be utilized.

Figure 1:
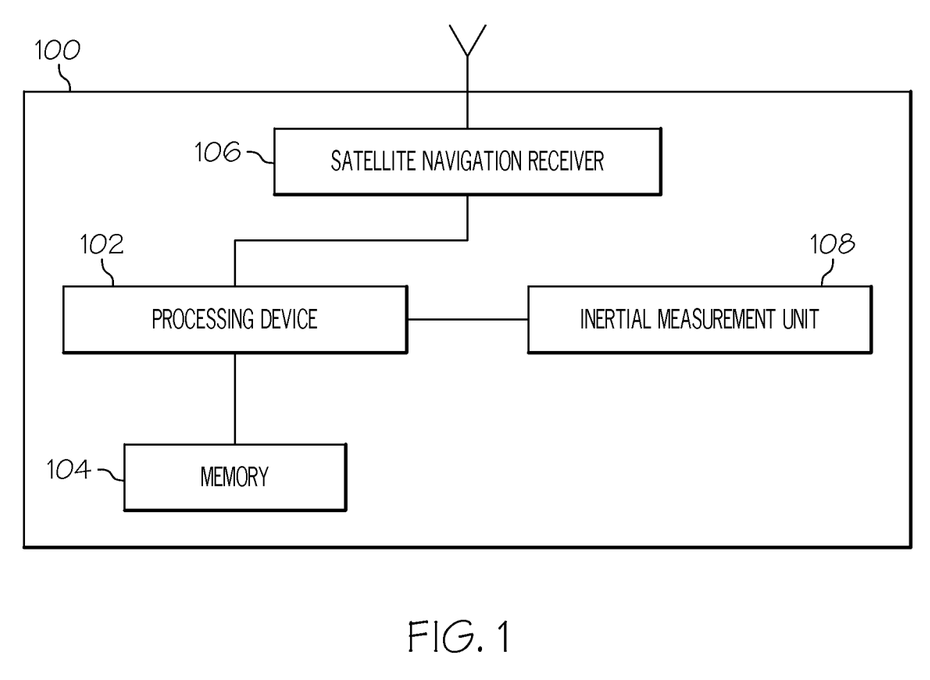
FIG. 1 is a block diagram of a navigation system according to one embodiment.

FIG. 1 illustrates one embodiment of an integrated GPS/INS navigation system 100 for determining a relative earth navigation solution. The navigation system 100 can include a processing device 102, a memory 104, a satellite navigation receiver 106, and an inertial measurement unit (IMU) 108. The processing device 102 can be coupled to and in communication with the satellite navigation receiver 106, the memory 104, and IMU 108. The memory 104 can include a machine readable media having instructions thereon. The instructions can be executable by the processor 102 to perform the methods described herein.

In an example, the satellite navigation receiver 106 can receive signals from one or more satellites and provide measurement data based on the signals to the processor 102. The satellite navigation receiver 106 can include a GPS receiver, GLONASS receiver, Galileo receiver, or other satellite navigation receivers. In one example, the satellite navigation receiver can include a 24 channel Trimble GPS receiver.

The IMU 108 can obtain inertial measurement data based on physical movements and provide the inertial measurement data to the processor 102. In an example, IMU 108 can include one or more gyroscopes, accelerometers, compasses, and other devices. Based on instructions in the memory 104, the processor 102 can process the satellite measurement data to obtain filtered pseudorange data as described below. The processor 102 can also determine an absolute navigation solution as a function of the satellite navigation measurements and the inertial measurement data. As used herein an absolute navigation solution refers to a solution for a first satellite navigation receiver that does not determine a differential from another satellite navigation receiver. A differential navigation solution, in contrast, refers to a first satellite navigation receiver that does determine a differential from another satellite navigation receiver (e.g., a ground based receiver).

By way of example and not limitation, processor 102 can include one or more microprocessors, memory elements, digital signal processing (DSP) elements, interface cards, and other standard components. Any of the foregoing may be supplemented by, or incorporated in, specially-designed application-specific integrated circuits (ASICs) or field programmable gate arrays (FPGAs). In an example, the processor 102 is configured to perform a particular task when the memory 104 includes instructions which, when executed by the processor 102, cause the processor to perform the task.

The memory device can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, optical disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media. The subject matter described herein can be implemented by computer executable instructions, such as program modules or components, which are executed by the processor 102.

Pseudorange and inertial data can be combined when attempting to achieve an accurate navigation solution. Some methods of combining the pseudorange and inertial data involve some type of Kalman filter where satellite measurement data is used to correct an inertial navigation system.

Figure 2:
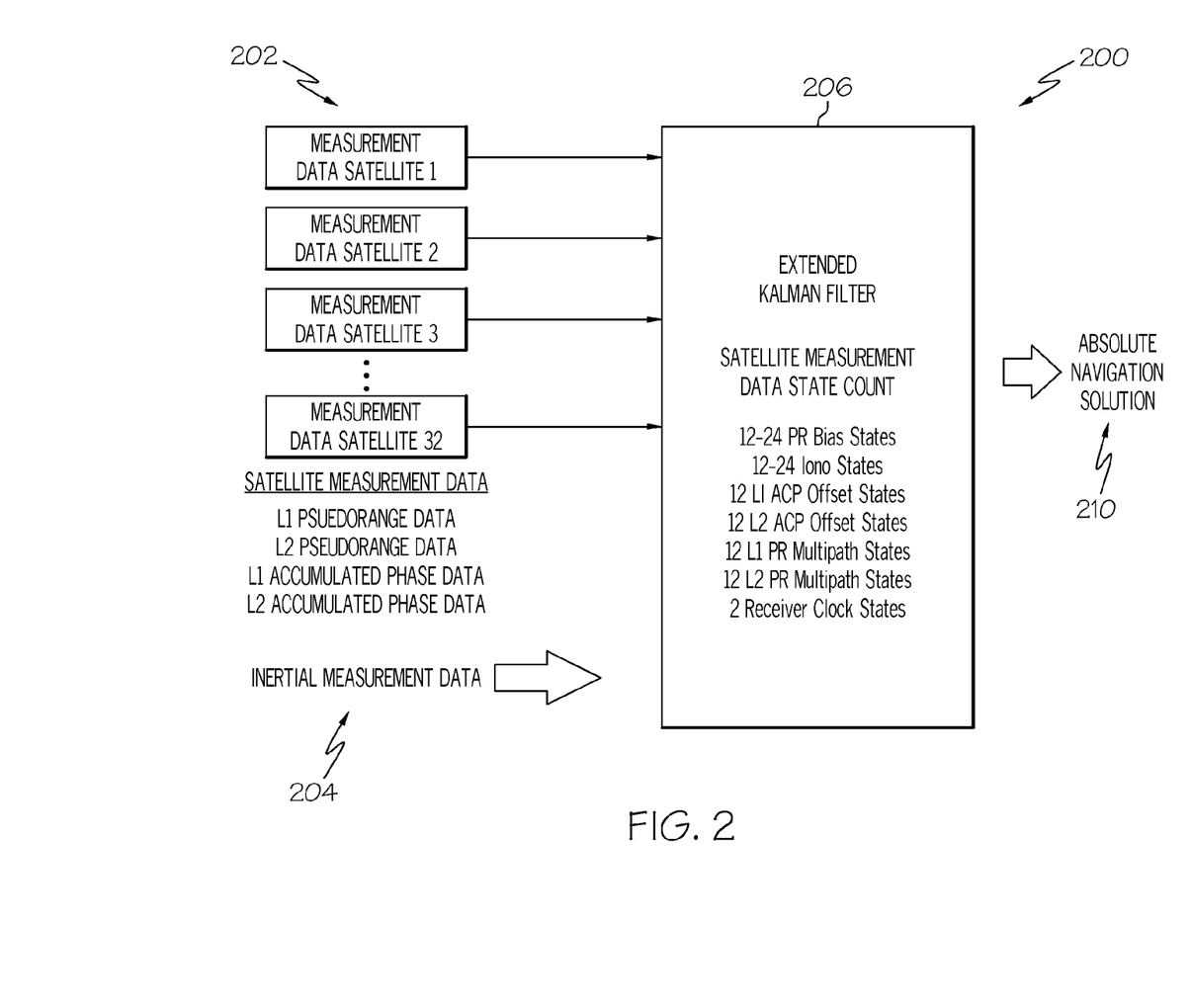
FIG. 2 is a block diagram of an exemplary method for determining an absolute navigation solution.

FIG. 2 illustrates an exemplary method 200 for integrating satellite navigation measurement data 202 and inertial data 204, which results in an accurate absolute relative navigation solution. In one embodiment, the method 200 can process all of the available satellite measurement data 202 in an extended Kalman filter 206. For example, the method 200 can process the L1 pseudorange, L2 pseudorange, L1 accumulated carrier phase, and L2 accumulated carrier phase measurements.

Other examples have processed the L1 Iono corrected pseudorange and L1 delta range. Delta range can correspond to the difference in accumulated phase from one satellite measurement epoch to the next.

In one example, the method 200 can combine all of this measurement data (L1 pseudorange, L2 pseudorange, L1 accumulated carrier phase, and L2 accumulated carrier phase measurements) with an inertial navigation solution 204 (e.g., inertial data velocity and delta angle measurements) to create an optimal earth relative absolute navigation solution 210. In one example, this method 200 can account for all known important error sources.

For each satellite from which signals can be received by the satellite navigation receiver 106, L1 pseudorange, L2 pseudorange, L1 accumulated carrier phase, and L2 accumulated carrier phase measurement data is processed by extended Kalman filter 206. For each of the satellite signals that are processed, the optimal version of the extended Kalman filter has states modeling the following errors: 1) a range bias state for satellite navigation space and control segment errors and tropospheric errors modeled as a first order Markov process; 2) a range bias state for L1 pseudorange multipath error modeled as a first order Markov process; 3) a range bias state for L2 pseudorange multipath error modeled as a first order Markov process; 4) A range bias for ionospheric error (this can be modeled as a one or two dimensional Markov process; 5) an L1 accumulated phase offset range state; and 6) an L2 accumulated phase offset range state.

The number of states used for modeling GPS errors can be a function of the number of expected satellite measurement data for the all-in-view (all satellite signals received by the receiver 106). In one example, the number of possible satellites producing measurements is 12, resulting in 72 total states. In addition, the filter design can use a satellite receiver clock error state (clock bias) and a satellite receiver clock error rate state (clock frequency). In an example, the total state count for representing GPS errors for the filter 206 can range from 50 to 98 states.

In another example, three states can be used to represent position error, three states can represent velocity error, and three states represent attitude error. In a further example, the Kalman filter can also implement three gravity error states.

The position and velocity states are necessary for all implementations. The attitude states are useful when integrating with inertials but are not required in all implementations. For example a space implementation would not need attitude states.

The inertial state selection can be a function of the quality and type of inertial measurement unit 108. For navigation quality inertial measurement units 108, the states can include gyroscope bias (3), gyroscope scale factor (3), gyroscope non-orthogonality (3), accelerometer bias (3), accelerometer scale factor (3), and accelerometer misalignment (6). Note that another possible implementation could use three accelerometer non-orthogonality and six gyroscope misalignment states. A combination of pre- and post-measurement processing, along with cross comparing change in phase with change in inertial data, can be used to detect accumulated phase cycle slips and ensure the accuracy of the navigation solution.

Figure 3:
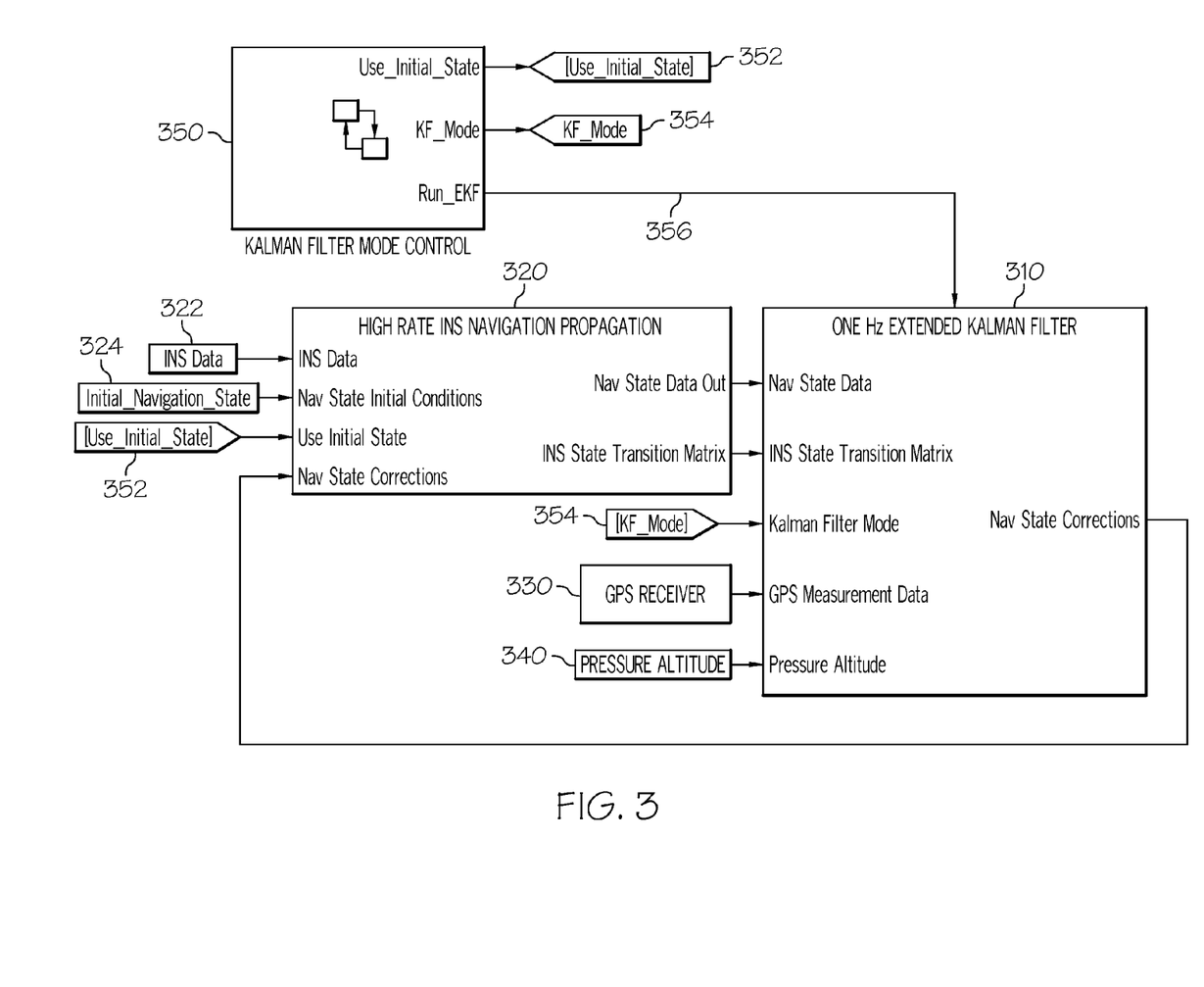
FIG. 3 is a block diagram depicting a general overview of an accumulated phase Kalman filter configuration according to one embodiment for use in the navigation system of FIG. 1.

FIG. 3 is a block diagram depicting a general overview of an accumulated phase Kalman filter configuration for use in the present integrated GPS/INS navigation system. A One Hz Extended Kalman Filter (EKF) 310 receives inputs from a high rate INS navigation propagation unit 320, a GPS receiver 330, a pressure altitude sensor 340, and a Kalman filter mode control unit 350.

The navigation propagation unit 320 receives INS data 322, which includes integrated acceleration data and gyroscope data, such as from an IMU. The navigation propagation unit 320 also receives initial navigation state conditions 324, which contain initial estimates of position, velocity, and attitude. Since EKF 310 aligns the INS and uses GPS data, it is not necessary for the initial conditions to be very accurate. The navigation propagation unit 320 outputs navigation state data to EKF 310. The navigation state data includes current position, velocity, and attitude data. The navigation propagation unit 320 also outputs an INS state transition matrix to EKF 310. The state transition matrix is discussed in further detail hereafter.

The GPS receiver 330 outputs GPS measurement data to EKF 310. The GPS measurement data includes L1 and L2 pseudorange, L1 and L2 accumulated phase, and satellite ephemeris information. The pressure altitude sensor 340 outputs pressure altitude data to EKF 310.

The Kalman filter mode control unit 350 generates a use initial state data command 352 that is input into navigation propagation unit 320, and generates a Kalman Filter (KF) mode command 354 that is input into EKF 310. The Kalman filter mode control unit 350 also outputs a run EKF command 356 to EKF 310 to initiate operation. The EKF 310 outputs navigation state corrections in a feedback loop to an input of navigation propagation unit 320. Other mode commands that can be implemented include a standby mode before the Kalman filter starts, an initialization mode for Kalman filter start, a coarse align mode if coarse align attitude is required, and a normal operating mode where standard filter equations are executed. Further details of EKF 310 are described hereafter.

Figure 4:
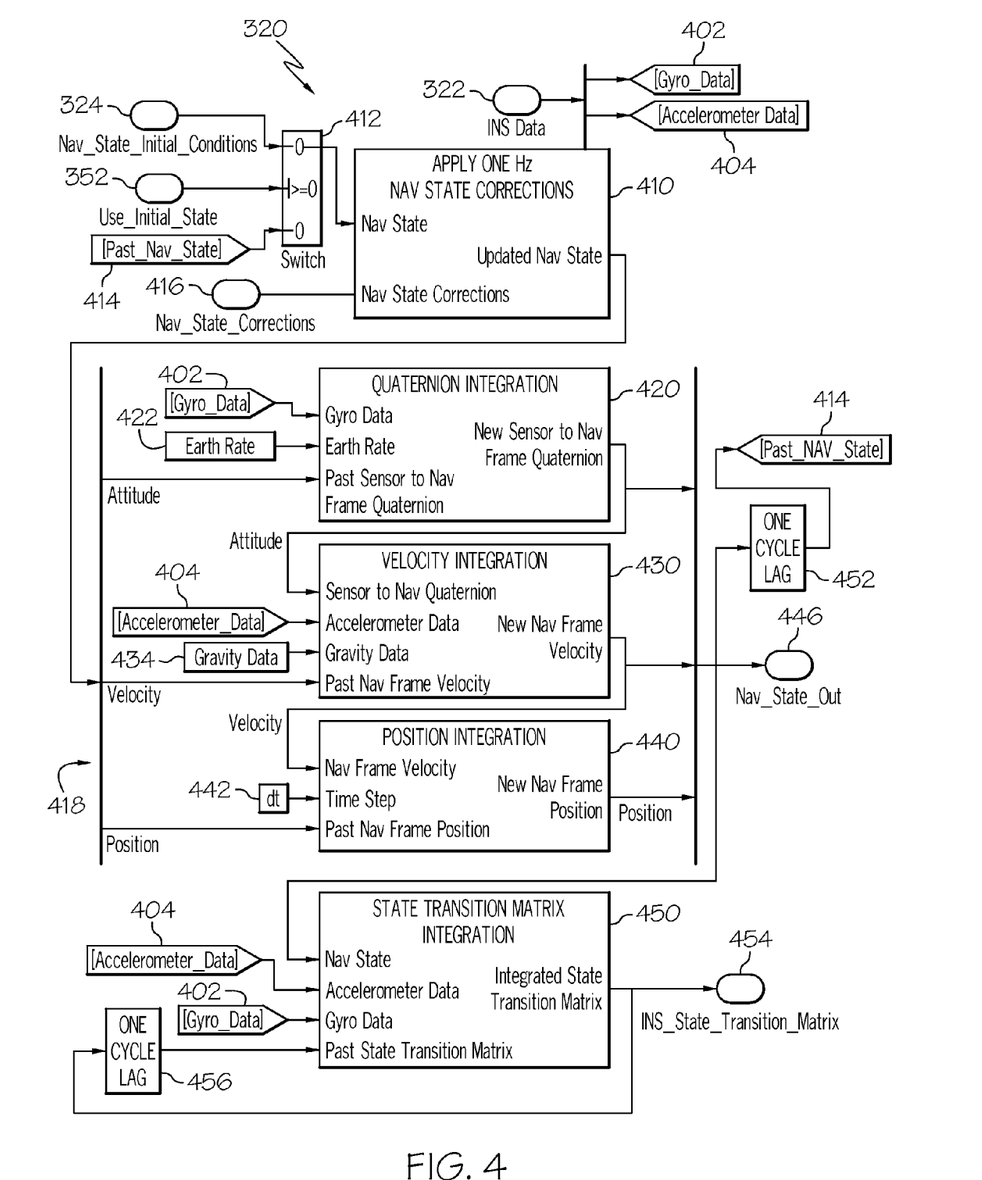
FIG. 4 is a block diagram depicting further details of a high rate inertial navigation solution (INS) navigation propagation module used in the Kalman filter configuration of FIG. 3.

FIG. 4 is a block diagram depicting further details of the high rate INS navigation propagation unit 320. The INS data 322 received by navigation propagation unit 320 includes gyroscope data 402 and accelerometer data 404. An apply one Hz navigation state corrections module 410 receives navigation state data through a switch 412, which is configured to input initial navigation state conditions 324, the use initial state data command 352, and past navigation state data 414. The navigation state corrections module 410 also receives navigation state corrections data 416 from EKF 310. The navigation state corrections module 410 outputs updated navigation state data, including attitude, velocity, and position measurements, to an integrator 418 that includes a quaternion integration module 420, a velocity integration module 430, and a position integration module 440.

The quaternion integration module 420 receives gyroscope data 402, Earth rate data 422, and a past sensor to navigation frame quaternion from the attitude measurement input into integrator 418. The quaternion integration module 420 outputs a new sensor to navigation frame quaternion in the form of an integrated attitude, which is sent to an input of velocity integration module 430 and the output of integrator 418. The velocity integration module 430 also receives accelerometer data 404, gravity data 434, and a past navigation frame velocity from the velocity measurement input into integrator 418. The velocity integration module 430 outputs a new navigation frame velocity in the form of an integrated velocity, which is sent to an input of position integration module 440. The position integration module 440 also receives a time step from a delta time function 442, and a past navigation frame position from the position measurement input into integrator 418. The position integration module 440 outputs a new navigation frame position in the form of an integrated position. The integrated attitude, velocity, and position are output from integrator 418 as navigation state data 446.

A state transition matrix integration module 450 receives navigation state data 446, accelerometer data 404, and gyroscope data 402. The state transition matrix integration module 450 outputs an integrated INS state transition matrix 454, which is fed back to an input of state transition matrix integration module 450 through a one cycle lag module 456. The past navigation state data 414 is output through a one cycle lag module 452. The state transition matrix can be derived via standard Kalman filter techniques.

Figure 5:
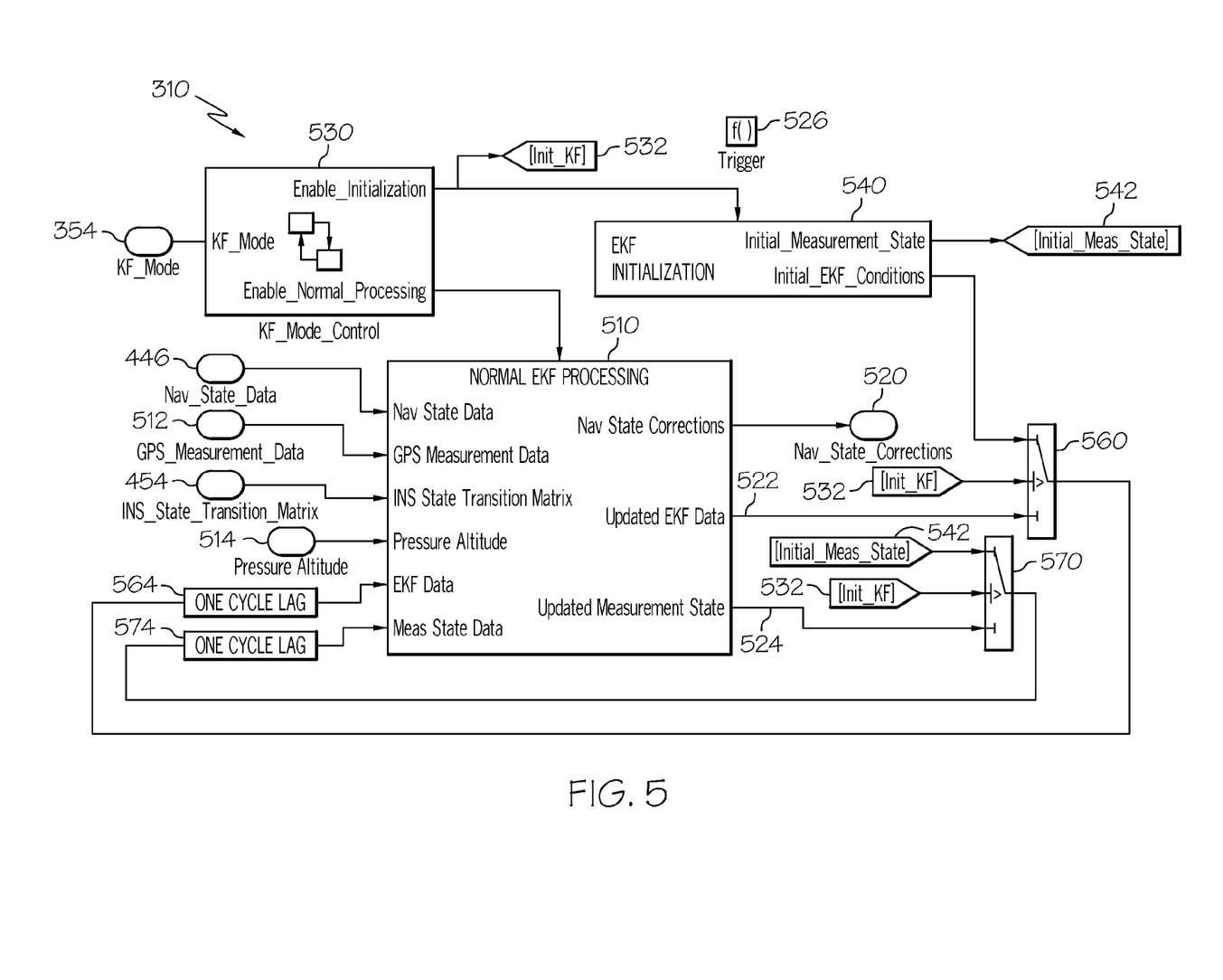
FIG. 5 is a block diagram depicting further details of a one Hz extended Kalman filter (EKF) used in the Kalman filter configuration of FIG. 3.

FIG. 5 is a block diagram depicting further details of EKF 310. A normal EKF processing unit 510 receives navigation state data 446, GPS measurement data 512, the INS state transition matrix 454, and pressure altitude data 514. The normal EKF processing unit 510 outputs navigation state corrections 520, updated EKF data 522, and updated measurement state data 524. A trigger 526 is also provided to respond to the run EKF command 356 (FIG. 3) by executing the EKF.

A Kalman filter (KF) mode control module 530 receives KF mode command 354, and outputs an enable initialization KF command 532 to an EKF initialization module 540, which outputs initial measurement state data 542. The KF mode control module 530 also outputs an enable normal processing command to normal EKF processing unit 510. The EKF initialization module 540 also outputs initial EKF conditions data. A switch 560 is configured to direct initialization EKF command 532, updated EKF data 522, or the initial EKF conditions data to an EKF data input of processing unit 510 through a one cycle lag module 564. The EKF data includes the UD (U matrix, D vector) representation of the covariance matrix and the error state vector. A switch 570 is configured to direct initial measurement state data 542, initialization KF command 532, or updated measurement state data 524 to a measurement state data input of processing unit 510 through a one cycle lag module 574.

Figure 6A:
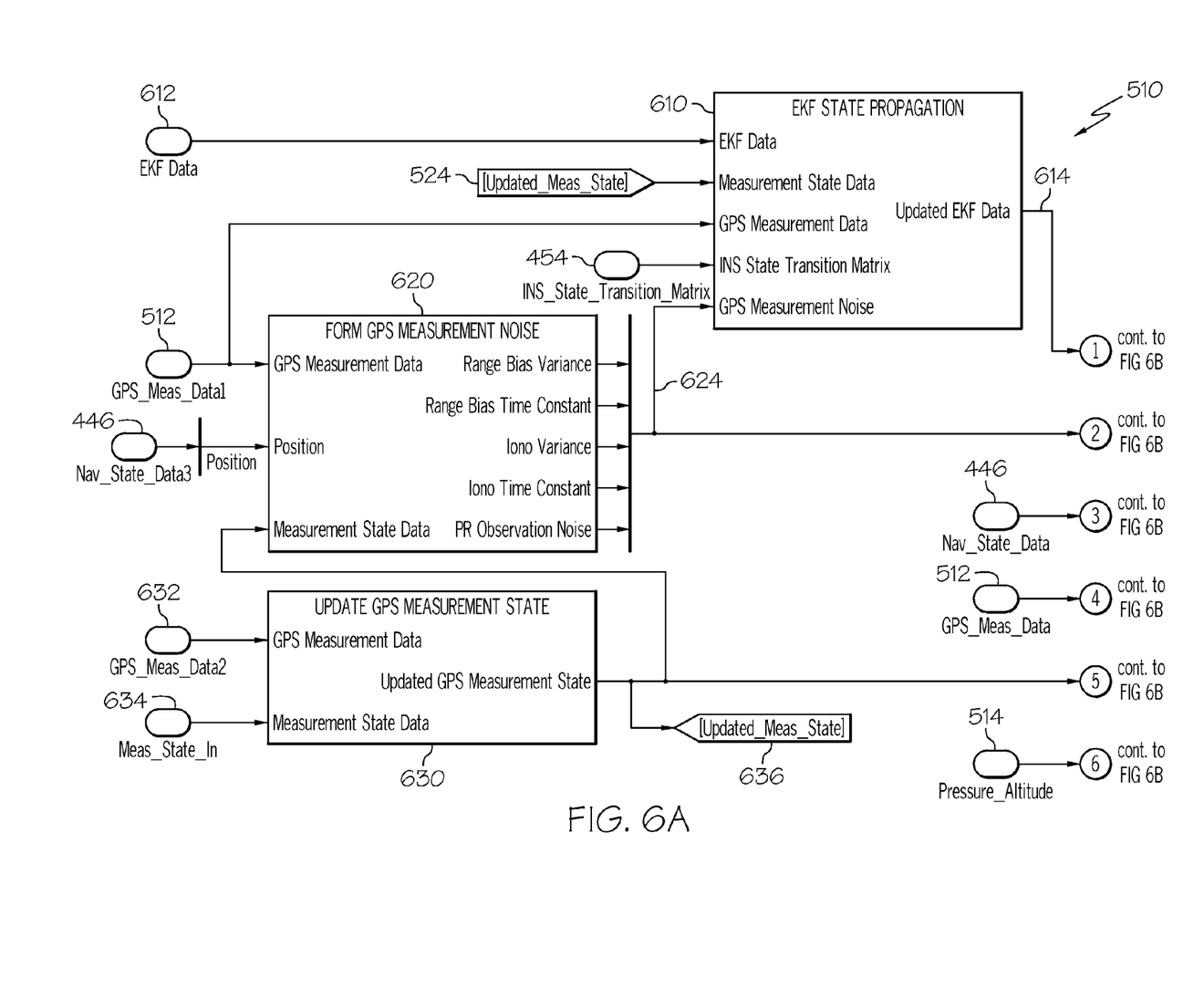
FIGS. 6A and 6B are block diagrams depicting further details of a normal EKF processing module employed in the EKF of FIG. 5.
Figure 6B:
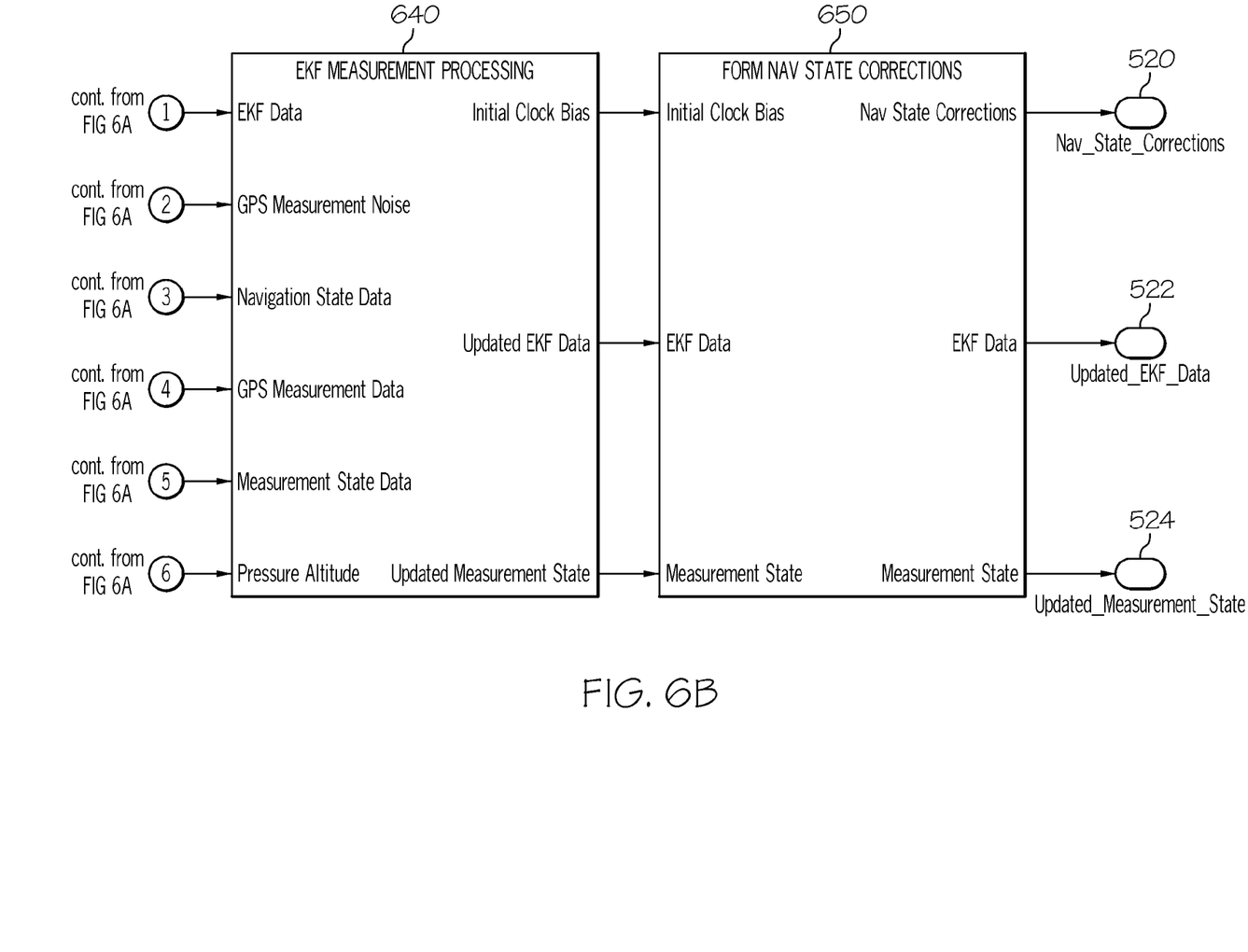

FIGS. 6A and 6B are block diagrams depicting further details of the normal EKF processing unit 510, which includes an EKF state propagation module 610, a form GPS measurement noise module 620, an update GPS measurement state module 630, an EKF measurement processing module 640, and a form navigation state corrections module 650.

The EKF state propagation module 610 receives EKF data 612, updated measurement state data 524, GPS measurement data 512, and the INS state transition matrix 454. The EKF state propagation module 610 outputs updated EKF data 614 to measurement processing module 640.

The GPS measurement noise module 620 receives GPS measurement data 512, and position data from navigation state data 446. The GPS measurement noise module 620 outputs a range bias variance, a range bias time constant, an iono variance, an iono time constant, and pseudorange (PR) observation noise data, which are processed to produce GPS measurement noise data 624 that is input into state propagation module 610 and measurement processing module 640. The form of GPS measurement noise is summarized in Table 1.

TABLE 1

| GPS Measurement Processing Error Source | EKF Allocation |
|---|---|
| Space & Control Segment | Pseudorange Bias States |
| Troposphere | Pseudorange Bias States |
| Ionospheric Delay | Iono States |
| Pseudorange Multipath | PR Measurement Noise |
| Receiver Noise and Tracking Errors | PR Measurement Noise, Accumulated Phase Measurement Noise |
| Receiver Clock Error | Clock Bias State and Clock Frequency State |

The processing in GPS measurement noise module 620 performs the allocation from Table 1. The processing sets the expected pseudorange bias variance to a combination of the expected space and control error and the tropospheric error; sets the ionospheric state variance to the expected ionospheric error; sets the PR measurement noise to a combination of the expected multipath error and the expected PR receiver noise; sets the accumulated phase measurement noise to the expected phase noise; and sets the clock bias and clock frequency noise terms.

The GPS measurement state module 630 receives GPS measurement data 632 and measurement state data 634, and outputs an updated GPS measurement state 636 to GPS measurement noise module 620 and measurement processing module 640. The process carried out by GPS measurement state module 630 involves controlling counters or flags that allow GPS observations to be processed, and maintaining the GPS bias states. Each bias state is assigned to a satellite or space vehicle (SV). For example, with a 24 channel GPS receiver this involves 12 SVs on L1 and 12 SVs on L2. The assumption is that the same SVs are looked for on both the L1 and L2 channels. In other words, while it is possible to have L1 only data for SV1 and L2 only data for SV2, the GPS receiver is configured to look for both L1 and L2 data from the same SV for optimal performance. When a satellite drops out of view and a new satellite becomes visible, the states must be re-allocated to the new satellite. The process responds to accumulated phase cycle slips by resetting the accumulated phase offset states.

As described above, EKF measurement processing module 640 receives EKF data 614, GPS measurement noise data 624, and updated GPS measurement state data 636. The processing module 640 also receives navigation state data 446, GPS measurement data 512, and pressure altitude data 514. The processing module 640 outputs an initial clock bias, updated EKF data, and updated measurement state data, to respective inputs of navigation state corrections module 650, which in turn outputs navigation state corrections 520, updated EKF data 522, and updated measurement state data 524.

Figure 7:
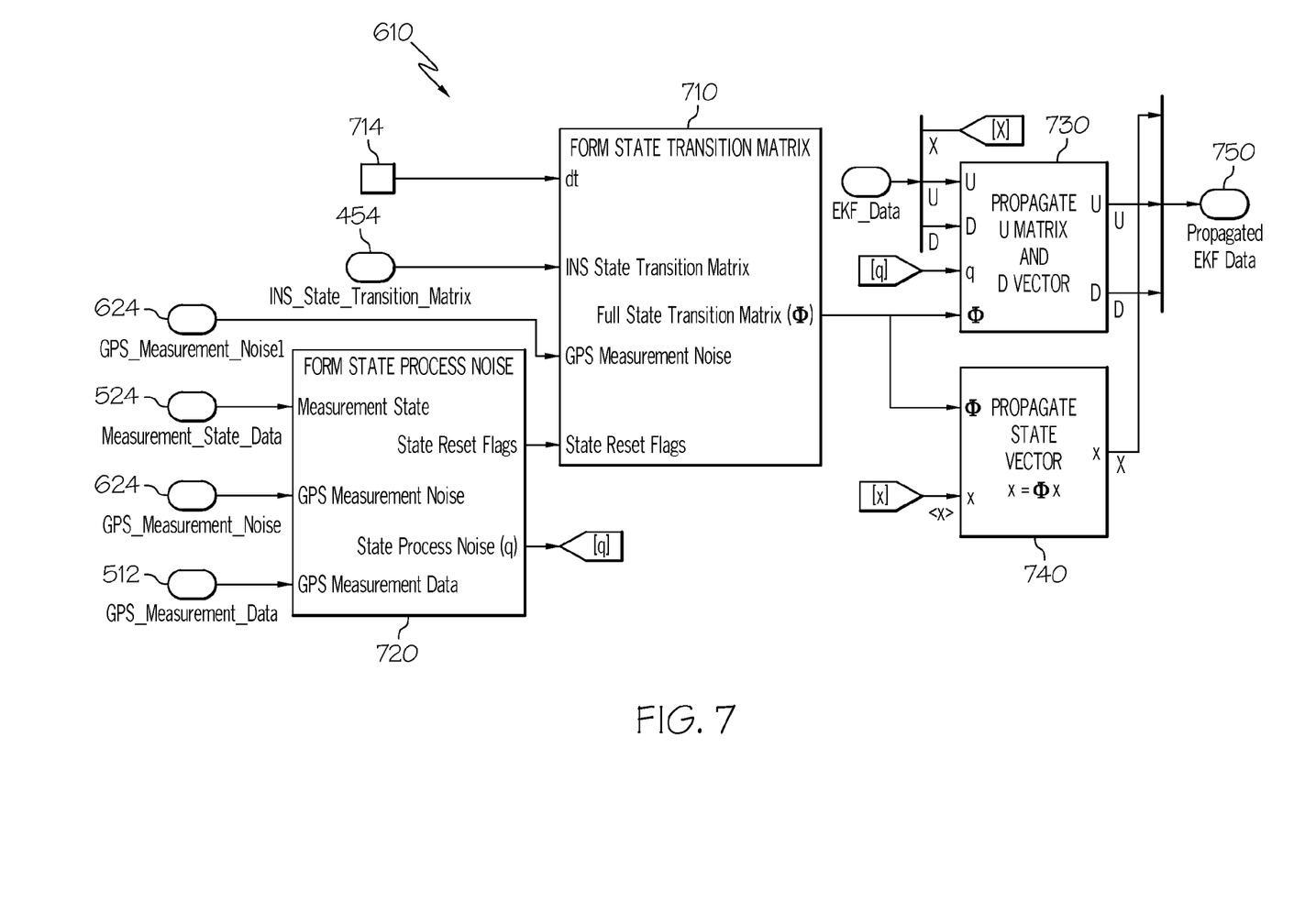
FIG. 7 is a block diagram depicting further details of an EKF state propagation module used in the normal EKF processing module shown in FIG. 6A.

FIG. 7 is a block diagram depicting further details of the EKF state propagation module 610, which includes a form state transition matrix module 710 and a form state process noise module 720. The form state transition matrix module 710 receives INS state transition matrix 454, GPS measurement noise data 624, and a time step (dt) from a clock 714. The state transition matrix module 710 outputs a full state transition matrix ($\Phi$) to a U matrix and D vector propagation module 730, and a state vector propagation module 740. The propagation of the U matrix and D vector can be accomplished via the algorithms described in G. J. Bierman, *Factorization Methods for Discrete Sequential Estimation*, New York: Academic Press, pp. 53, 76-81 (1977), the disclosure of which is incorporated by reference.

The state process noise module 720 receives measurement state data 524, GPS measurement noise data 624, and GPS Measurement Data 512. The state process noise module 720 outputs state reset flags to an input of state transition matrix module 710, and outputs state process noise data (q) that is sent to an input of propagation module 730. A state vector (x) is input into propagation module 740.

An exemplary state transition matrix formulation follows:

$$\Phi = \begin{bmatrix} \Phi_{11} & \Phi_{12} & 0 & 0 \\ 0 & \Phi_{22} & 0 & 0 \\ 0 & 0 & \Phi_{33} & 0 \\ 0 & 0 & 0 & \Phi_{44} \end{bmatrix}$$

where:

$\Phi_{11}$ includes the navigation states that have other states coupling into them.

$\Phi_{22}$ includes the INS sensor states that couple into the navigation states.

$\Phi_{12}$ includes the coupling of part 2 states into part 1 states. Note that this is now smaller than the baseline model.

$\Phi_{33}$ includes aiding states that are modeled as first order Markov processes or random constants, and can be modeled as a vector. These states do not couple into navigation states.

$\Phi_{44}$ includes aiding states that are modeled as second order Markov processes or, in general, require two states such as clock bias and clock frequency. These states do not couple into navigation states. The matrix is of the form below and it can be stored as an N×2 matrix.

$$\Phi_{44} = \begin{bmatrix} \Phi_{11}^{x_1} & \Phi_{12}^{x_1} & 0 & 0 & 0 & 0 \\ \Phi_{21}^{x_1} & \Phi_{22}^{x_1} & 0 & 0 & 0 & 0 \\ 0 & 0 & . & . & 0 & 0 \\ 0 & 0 & . & . & 0 & 0 \\ 0 & 0 & 0 & 0 & \Phi_{11}^{x_N} & \Phi_{12}^{x_N} \\ 0 & 0 & 0 & 0 & \Phi_{21}^{x_N} & \Phi_{22}^{x_N} \end{bmatrix}$$

As shown in FIG. 7, the output from U matrix and D vector propagation module 730, and the output of state vector propagation module 740, are processed to generate propagated EKF data 750.

Figure 8:
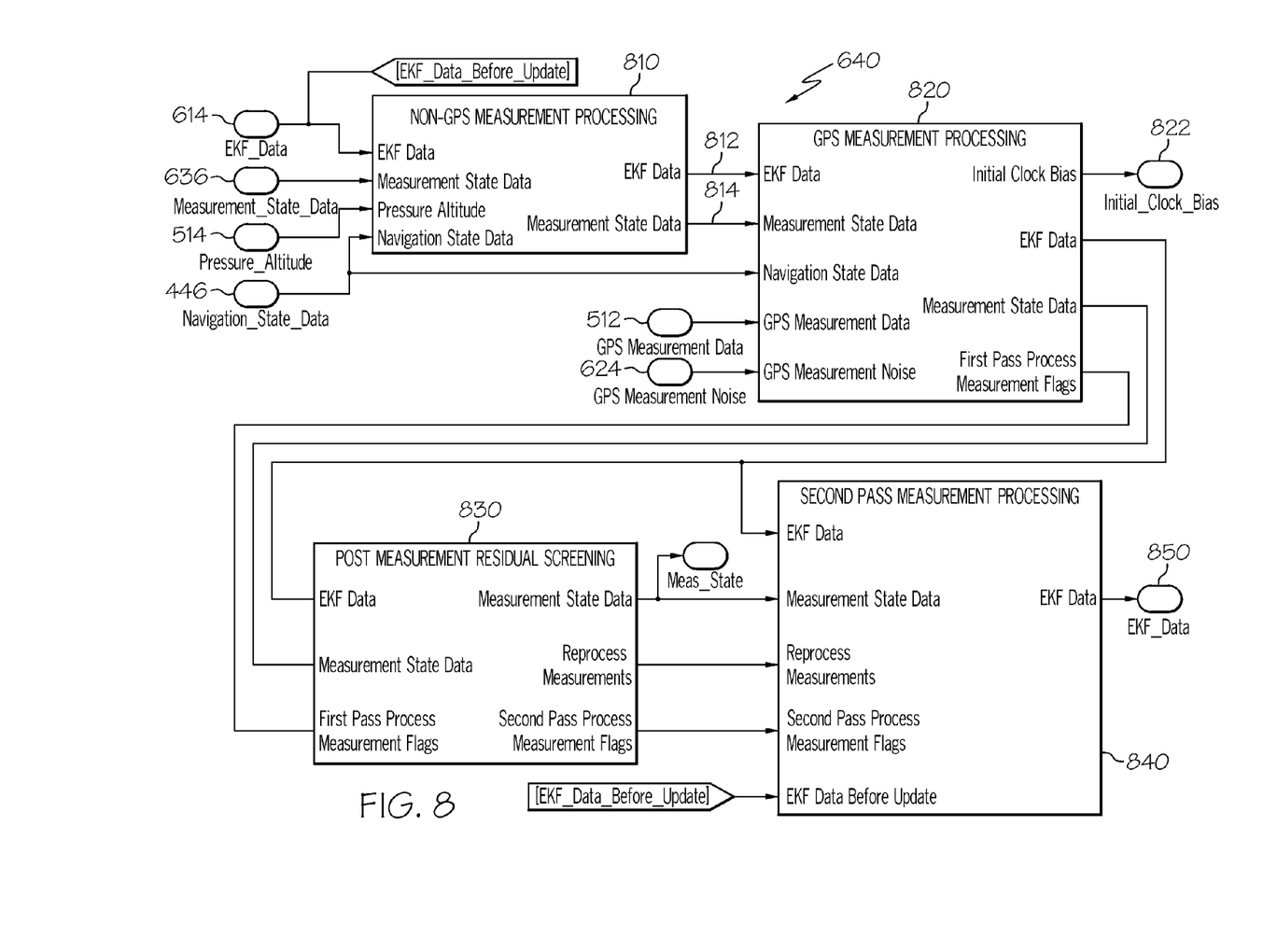
FIG. 8 is a block diagram depicting further details of an EKF measurement processing unit used in the normal EKF processing module shown in FIG. 6B.

FIG. 8 is a block diagram depicting further details of the EKF measurement processing module 640 (FIG. 6B), which includes a non-GPS measurement processing unit 810, a GPS measurement processing unit 820, a post measurement residual screening unit 830, and a second pass measurement processing unit 840.

The non-GPS measurement processing unit 810 receives EKF data 614, measurement state data 636, pressure altitude data 514, and navigation state data 446. The non-GPS measurement processing unit 810 outputs EKF data 812 and measurement state data 814 to respective inputs of GPS measurement processing unit 820. The GPS measurement processing unit 820 further receives navigation state data 446, GPS measurement data 512, and GPS measurement noise 624.

Some examples of non-GPS measurement processing include zero velocity updates when stationary, pressure altitude, position updates, Doppler radar, and ships inertial navigation system. The processing flow is to form the observation, form the observation sensitivity matrix and measurement process noise, perform some type of residual test, and update the U matrix, the D vector, and the state vector (x) if the residual test passes.

The GPS measurement processing unit 820 outputs EKF data, measurement state data, and first pass process measurement flags to respective inputs of post measurement residual screening unit 830. The GPS measurement processing unit 820 also outputs an initial clock bias 822.

The post measurement residual screening unit 830 outputs measurement state data, reprocess measurements, and second pass process measurement flags to respective inputs of second pass measurement processing unit 840, which also receives EKF data from GPS measurement processing unit 820 and EKF data before it is updated by the non-GPS measurement processing unit 810. The various received data is processed and output by second pass measurement processing unit 840 as EKF data 850.

The second pass measurement processing unit 840 executes if any of the post measurement residual checks fail. Measurements that pass both the first and second pass test are allowed to be processed. Measurements that fail either test are not processed. If all measurements pass the second pass test then reprocessing is not necessary (because they have already been processed).

Figure 9:
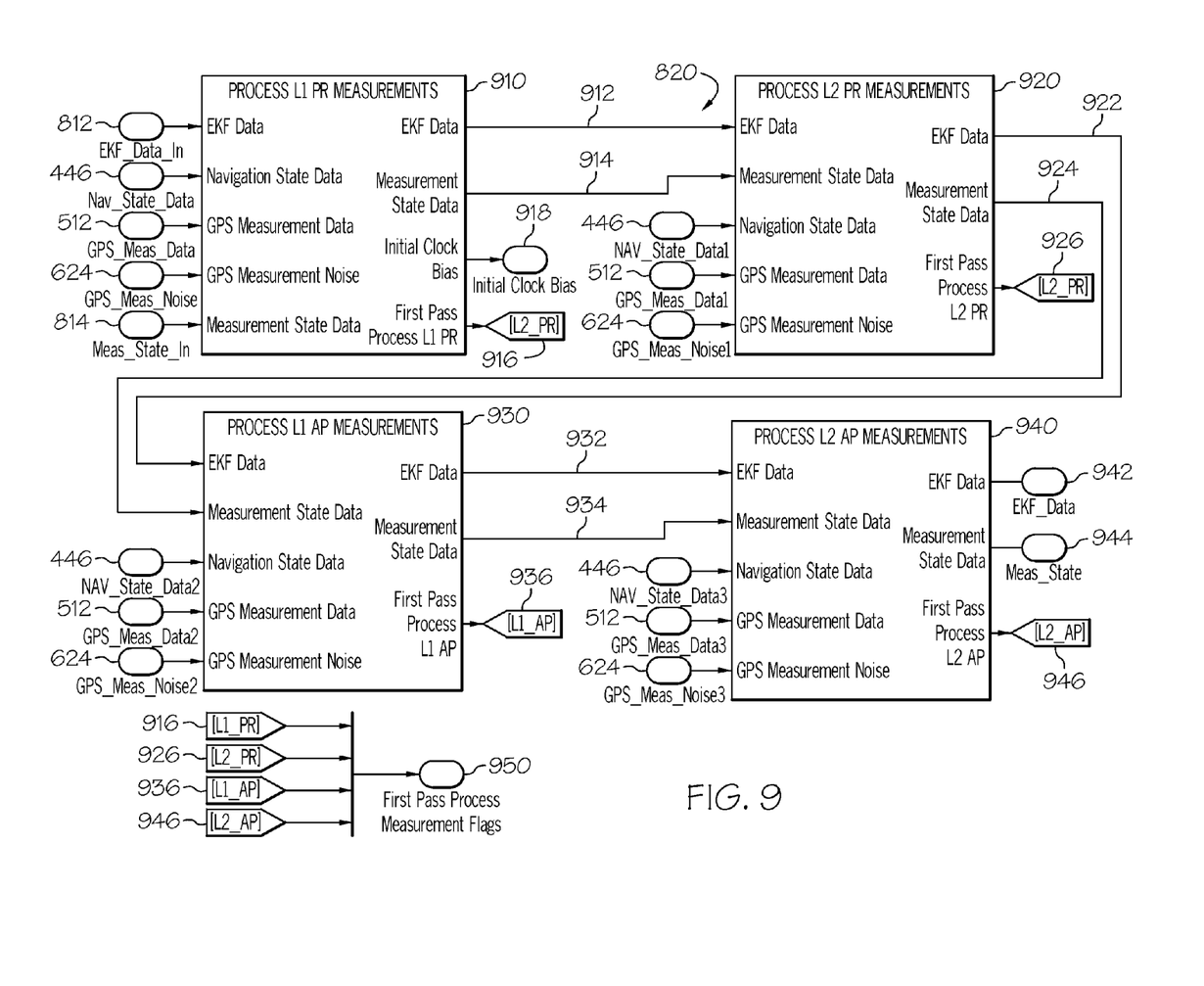
FIG. 9 is a block diagram depicting further details of a GPS measurement processing module used in the EKF measurement processing unit of FIG. 8.

FIG. 9 is a block diagram depicting further details of the GPS measurement processing unit 820 of FIG. 8, which includes a processing unit 910 for L1 PseudoRange (PR) measurements, a processing unit 920 for L2 PR measurements, a processing unit 930 for L1 Accumulated Phase (AP) measurements, and a processing unit 940 for L2 AP measurements.

The processing unit 910 receives EKF data 812, navigation state data 446, GPS measurement data 512, GPS measurement noise data 624, and measurement state data 814. This data is processed by processing unit 910, which outputs EKF data 912 and measurement state data 914 to processing unit 920. The processing unit 910 also outputs a first pass process L1 PR 916, and an initial clock bias 918. The processing unit 920 also receives navigation state data 446, GPS measurement data 512, and GPS measurement noise data 624. The data input into processing unit 920 is processed and output as EKF data 922, measurement state data 924, and a first pass process L2 PR 926.

The processing unit 930 receives EKF data 922 and measurement state data 924 from processing unit 910, as well as navigation state data 446, GPS measurement data 512, and GPS measurement noise data 624. This data is processed by processing unit 930, which outputs EKF data 932 and measurement state data 934 to processing unit 940. The processing unit 930 also outputs a first pass process L1 AP 936. The processing unit 940 also receives navigation state data 446, GPS measurement data 512, and GPS measurement noise data 624. The data input into processing unit 940 is processed and output as EKF data 942, measurement state data 944, and a first pass process L2 AP 946.

The outputs of L1 PR 916, L2 PR 926, L1 AP 936, and L2 AP 946 are combined to generate first pass process measurement flags 950, which are configured to tell the EKF to process valid measurements that pass the first pass measurement test.

The post measurement residual screening test compares the expected measurement variance with the actual residual formed using the updated filter data. Any measurements that fail the test are flagged as bad. If any measurements are bad, the failure information is used to determine if any undetected accumulated phase cycle slips occurred. The cycle slips are in the range of at least 19 centimeters for L1 and 24.4 centimeters for L2. Note that the residual can be slightly smaller then these numbers based on current system error. If a cycle slip is detected, the reset of the associated offset state is set up.

The processing steps for L1 PR measurements, L2 PR measurements, L1 AP measurements, and L2 AP measurements are summarized as follows.

L1 PR Measurement Processing

For each visible satellite with a valid L1 PR measurement, the following steps are performed.
1. Form the range vector from the GPS antenna to the satellite.
2. Form the magnitude of the range vector.
3. Form a unit vector to the satellite.
4. Form the expected GPS measurement from the range magnitude and the current clock bias.
5. Form the GPS measurement residual as the L1 PR minus the expected measurement.
6. Form the sensitivity vector for the measurement, derived from the partial derivative of a measurement equation with respect to modeled states. These modeled states include position, clock bias, pseudorange bias, and ionosphere. Note that the sensitivity to ionosphere is 1 for L1 PR measurements. The measurement equation is the measured GPS pseudorange minus the expected pseudorange. The expected pseudorange includes the expected range plus the expected clock bias plus the current PR bias estimate plus the current iono error estimate.
7. Form the observation noise for the measurement accounting for expected GPS pseudorange white noise and multipath.

After performing the above steps, if the clock bias has not been initialized, the clock bias is set to the average PR measurement. The following steps are performed after clock bias initialization.
1. Perform a measurement residual test, comparing the expected measurement variance with the actual residual.
2. For all of the measurements that pass the residual test, update the state vector, the U matrix, and the D vector using a UD measurement update algorithm.

L2 PR Measurement Processing

For each visible satellite with a valid L2 PR measurement, the following steps are performed.
1. Form the range vector from the GPS antenna to the satellite.
2. Form the magnitude of the range vector.
3. Form a unit vector to the satellite.
4. Form the expected GPS measurement from the range magnitude and the current clock bias.
5. Form the GPS measurement residual as the L2 PR minus the expected measurement.
6. Form the sensitivity vector for the measurement, derived from the partial derivative of the measurement equation with respect to modeled states. These modeled states include position, clock bias, pseudorange bias, and ionosphere. Note that for L2 PR measurements, the sensitivity to ionosphere is Gamma, which is the ratio of L1 frequency squared over L2 frequency squared.
7. Form the observation noise for the measurement accounting for expected GPS pseudorange white noise and multipath.

The following steps are performed after clock bias initialization.
1. Perform a measurement residual test, comparing the expected measurement variance with the actual residual.
2. For all of the measurements that pass the residual test, update the state vector, the U matrix, and the D vector using a UD measurement update algorithm.

L1 AP Measurement Processing

For each visible satellite with a valid L1 AP measurement, the following steps are performed.
1. Form the range vector from the GPS antenna to the satellite.
2. Form the magnitude of the range vector.
3. Form a unit vector to the satellite.
4. Form the expected GPS measurement from the range magnitude and the current clock bias.
5. Form the GPS measurement residual as the L1 AP measurement minus the expected measurement.
6. Form the sensitivity vector for the measurement, derived from the partial derivative of the measurement equation with respect to modeled states. These modeled states include position, clock bias, pseudorange bias, L1 accumulated phase offset, and ionosphere. Note that the sensitivity to ionosphere is $-1$ for L1 AP measurements.
7. Form the observation noise for the measurement accounting for expected GPS phase white noise.

The following steps are performed after clock bias initialization.
1. Perform a measurement residual test, comparing the expected measurement variance with the actual residual.
2. For all of the measurements that pass the residual test, update the state vector, the U matrix, and the D vector using a UD measurement update algorithm.

With respect to AP offset initialization, the accumulated phase offset values are an unknown fixed number of GPS wavelengths from the satellite. The EKF does not attempt to "fix" the offset value because of the number of unknowns. The offset can be initialized to the current L1 PR minus the current L1 AP, or the EKF can have its covariance set to a large number to allow the initialization. The initialization method has numerical advantages over the filter based method, but both can work.

L2 AP Measurement Processing

For each visible satellite with a valid L2 AP measurement, the following steps are performed.
1. Form the range vector from the GPS antenna to the satellite.
2. Form the magnitude of the range vector.
3. Form a unit vector to the satellite.
4. Form the expected GPS measurement from the range magnitude and the current clock bias.
5. Form the GPS measurement residual as the L2 AP measurement minus the expected measurement.
6. Form the sensitivity vector for the measurement, derived from the partial derivative of the measurement equation with respect to modeled states. These modeled states include position, clock bias, pseudorange bias, L2 accumulated phase offset, and ionosphere. Note that the sensitivity to ionosphere is $-$Gamma for L2 AP measurements.
7. Form the observation noise for the measurement accounting for expected GPS phase white noise.

The following steps are performed after clock bias initialization.
1. Perform a measurement residual test, comparing the expected measurement variance with the actual residual.
2. For all of the measurements that pass the residual test, update the state vector, the U matrix, and the D vector using a UD measurement update algorithm.

With respect to AP offset initialization, the accumulated phase offset values are an unknown fixed number of GPS wavelengths from the satellite. This EKF does not attempt to "fix" the offset value because of the number of unknowns. The offset can be initialized to the current L2 PR minus the current L2 AP, or the EKF can have its covariance set to a large number to allow the initialization. The initialization method has numerical advantages over the filter based method, but both can work.

Example Embodiments

Example 1 includes a navigation system comprising at least one processor; a satellite navigation receiver operatively coupled to the processor and configured to receive a plurality of navigation signals from one or more navigation satellites; an inertial measurement unit operatively coupled to the processor and configured to generate inertial measurement data; an extended Kalman filter configured to receive the plurality of navigation signals and the inertial measurement data; and a processor readable storage medium including instructions executable by the processor to combine the plurality of satellite signals with the inertial measurement data in the extended Kalman filter to generate a navigation solution. The plurality of navigation signals includes L1 pseudorange measurements, L2 pseudorange measurements, L1 accumulated carrier phase measurements, and L2 accumulated carrier phase measurements.

Example 2 includes the navigation system of Example 1, and further comprises a navigation propagation unit configured to receive the inertial measurement data and initial navigation state conditions data, and output navigation state data and an inertial navigation solution (INS) state transition matrix to the extended Kalman filter.

Example 3 includes the navigation system of any of Examples 1-2, wherein the extended Kalman filter is further configured to receive pressure altitude data.

Example 4 includes the navigation system of any of Examples 2-3, wherein the extended Kalman filter is further configured to output navigation state corrections data in a feedback loop to an input of the navigation propagation unit.

Example 5 includes the navigation system of any of Examples 2-4, wherein the navigation propagation unit comprises a navigation state corrections module configured to receive navigation state data, and the navigation state corrections data; an integrator configured to receive updated navigation state data from the navigation state corrections module; and a state transition matrix integration module configured to receive navigation state data from the integrator and generate the INS state transition matrix.

Example 6 includes the navigation system of Example 5, wherein the integrator comprises a quaternion integration module configured to receive gyroscope data and earth rate data, and output a new sensor to navigation frame quaternion; a velocity integration module configured to receive accelerometer data and gravity data, and output a new navigation frame velocity; and a position integration module configured to receive a time step, and output a new navigation frame position; wherein the new sensor to navigation frame quaternion is input into the velocity integration module, and the new navigation frame velocity is input into the velocity integration module.

Example 7 includes the navigation system of any of Examples 5-6, wherein the extended Kalman filter includes a processing unit configured to receives navigation state data output by the integrator, GPS measurement data, the INS state transition matrix, and pressure altitude data.

Example 8 includes the navigation system of Example 7, wherein the processing unit generates the navigation state corrections, updated EKF data, and updated measurement state data.

Example 9 includes the navigation system of any of Examples 7-8, wherein the processing unit comprises an EKF state propagation module configured to generate the state transition matrix; and an EKF measurement processing module configured for non-GPS measurement processing, GPS measurement processing, post measurement residual screening, and second pass measurement processing.

Example 10 includes a navigation method comprising receiving navigation satellite measurement data from one or more navigation satellites, the satellite measurement data including L1 pseudorange measurements, L2 pseudorange measurements, L1 accumulated carrier phase measurements, and L2 accumulated carrier phase measurements; receiving inertial measurement data from one or more inertial sensors; processing the satellite measurement data with the inertial measurement data in an extended Kalman filter; and generating a navigation solution based on the processed satellite measurement data and inertial measurement data.

Example 11 includes the navigation method of Example 10, and further comprises receiving inertial navigation state conditions data; and generating an integrated inertial navigation solution state transition matrix in the extended Kalman filter.

Example 12 includes the navigation method of any of Examples 10-11, wherein for each visible satellite with valid L1 or L2 pseudorange measurements, the extended Kalman filter performs a process comprising forming a range vector from an antenna to the satellite; forming a magnitude of the range vector; forming a unit vector to the satellite; forming an expected GPS measurement from the magnitude of the range vector and a current clock bias; forming a GPS measurement residual by subtracting the expected GPS measurement from the L1 pseudorange measurement or the L2 pseudorange measurement; forming a sensitivity vector for the L1 pseudorange measurement or the L2 pseudorange measurement, derived from a partial derivative of the measurement equation with respect to modeled states; and forming observation noise for the L1 pseudorange measurement or the L2 pseudorange measurement, accounting for expected GPS pseudorange white noise and multipath.

Example 13 includes the navigation method of Example 12, wherein the modeled states include position, clock bias, pseudorange bias, and ionosphere.

Example 14 includes the navigation method of any of Examples 10-13, and further comprising after a clock bias initialization, performing a measurement residual test by comparing the expected measurement variance with the actual residual; and for all measurements that pass the residual test, updating a state vector, a U matrix, and a D vector using a UD measurement update algorithm.

Example 15 includes the navigation method of any of Examples 10-14, wherein for each visible satellite with valid L1 or L2 accumulated carrier phase measurements, the extended Kalman filter performs a process comprising forming a range vector from an antenna to the satellite; forming a magnitude of the range vector; forming a unit vector to the satellite; forming an expected GPS measurement from the magnitude of the range vector and a current clock bias; forming a GPS measurement residual by subtracting the expected GPS measurement from the L1 accumulated carrier phase measurement or the L2 accumulated carrier phase measurement; forming a sensitivity vector for the L1 accumulated carrier phase measurement or the L2 accumulated carrier phase measurement; derived from a partial derivative of a measurement equation with respect to modeled states for the L1 or L2 accumulated carrier phase measurements; and forming observation noise for the L1 accumulated carrier phase measurement or the L2 accumulated carrier phase measurement, accounting for expected GPS pseudorange white noise.

Example 16 includes the navigation method of Example 15, wherein the modeled states for the L1 accumulated carrier phase measurements include position, clock bias, pseudorange bias, L1 accumulated phase offset, and ionosphere.

Example 17 includes the navigation methods of any of Examples 15-16, wherein the modeled states for the L2 accumulated carrier phase measurements include position, clock bias, pseudorange bias, L2 accumulated phase offset, and ionosphere.

Example 18 includes the navigation methods of any of Example 15-17, and further comprising after a clock bias initialization, performing a measurement residual test by comparing the expected measurement variance with the actual residual; and for all measurements that pass the residual test, updating a state vector, a U matrix, and a D vector using a UD measurement update algorithm.

Example 19 includes a computer program product comprising a non-transitory computer readable medium including instructions stored thereon executable by a processor to perform a navigation method comprising receiving navigation satellite measurement data from one or more navigation satellites, the satellite measurement data including L1 pseudorange measurements, L2 pseudorange measurements, L1 accumulated carrier phase measurements, and L2 accumulated carrier phase measurements; receiving inertial measurement data from one or more inertial sensors; processing the satellite measurement data with the inertial measurement data in an extended Kalman filter; and generating a navigation solution based on the processed satellite measurement data and inertial measurement data.

Example 20 includes the computer program product of Example 19, wherein the method further comprises receiving inertial navigation state conditions data; and generating an integrated inertial navigation solution state transition matrix in the extended Kalman filter.

The present invention may be embodied in other forms without departing from its essential characteristics. The described embodiments are to be considered in all respects only as illustrative and not restrictive. Therefore, it is intended that this invention be limited only by the claims and the equivalents thereof.

What is claimed is:

1. A navigation system, comprising:
   at least one processor;
   a satellite navigation receiver operatively coupled to the processor and configured to receive a plurality of navigation signals from one or more navigation satellites;
   an inertial measurement unit operatively coupled to the processor and configured to generate inertial measurement data;
   an extended Kalman filter configured to receive the plurality of navigation signals and the inertial measurement data, wherein the extended Kalman filter models a range bias for ionospheric error; and
   a processor readable storage medium including instructions executable by the processor to combine the plurality of satellite signals with the inertial measurement data in the extended Kalman filter to generate an absolute navigation solution;
   wherein the plurality of navigation signals includes L1 pseudorange measurements, L2 pseudorange measurements, L1 accumulated carrier phase measurements, and L2 accumulated carrier phase measurements.

2. The navigation system of claim 1, further comprising a navigation propagation unit configured to receive the inertial measurement data and initial navigation state conditions data, and output navigation state data and an inertial navigation solution (INS) state transition matrix to the extended Kalman filter.

3. The navigation system of claim 1, wherein the extended Kalman filter is further configured to receive pressure altitude data.

4. The navigation system of claim 2, wherein the extended Kalman filter is further configured to output navigation state corrections data in a feedback loop to an input of the navigation propagation unit.

5. The navigation system of claim 4, wherein the navigation propagation unit comprises:
   a navigation state corrections module configured to receive navigation state data, and the navigation state corrections data;
   an integrator configured to receive updated navigation state data from the navigation state corrections module; and
   a state transition matrix integration module configured to receive navigation state data from the integrator and generate the INS state transition matrix.

6. The navigation system of claim 5, wherein the integrator comprises:
   a quaternion integration module configured to receive gyroscope data and earth rate data, and output a new sensor to navigation frame quaternion;
   a velocity integration module configured to receive accelerometer data and gravity data, and output a new navigation frame velocity; and
   a position integration module configured to receive a time step, and output a new navigation frame position;
   wherein the new sensor to navigation frame quaternion is input into the velocity integration module, and the new navigation frame velocity is input into the velocity integration module.

7. The navigation system of claim 5, wherein the extended Kalman filter includes a processing unit configured to receive navigation state data output by the integrator, GPS measurement data, the INS state transition matrix, and pressure altitude data.

8. The navigation system of claim 7, wherein the processing unit generates the navigation state corrections data, updated EKF data, and updated measurement state data.

9. The navigation system of claim 8, wherein the processing unit comprises:
   an EKF state propagation module configured to generate the INS state transition matrix; and
   an EKF measurement processing module configured for non-GPS measurement processing, GPS measurement processing, post measurement residual screening, and second pass measurement processing.

10. A navigation method, comprising:
    receiving navigation satellite measurement data in a satellite receiver from one or more navigation satellites, the satellite measurement data including L1 pseudorange measurements, L2 pseudorange measurements, L1 accumulated carrier phase measurements, and L2 accumulated carrier phase measurements;
    receiving inertial measurement data in a processing device from one or more inertial sensors;
    processing the satellite measurement data with the inertial measurement data in the processing device using an extended Kalman filter, wherein the extended Kalman filter models a range bias for ionospheric error; and
    generating an absolute navigation solution with the processing device based on the processed satellite measurement data and inertial measurement data.

11. The method of claim 10, further comprising:
    receiving inertial navigation state conditions data; and
    generating an integrated inertial navigation solution state transition matrix in the extended Kalman filter.

12. The method of claim 10, wherein for each visible satellite with valid L1 or L2 pseudorange measurements, the extended Kalman filter performs a process comprising:
    forming a range vector from an antenna to the satellite;
    forming a magnitude of the range vector;
    forming a unit vector to the satellite;
    forming an expected GPS measurement from the magnitude of the range vector and a current clock bias;
    forming a GPS measurement residual by subtracting the expected GPS measurement from the L1 pseudorange measurement or the L2 pseudorange measurement;
    forming a sensitivity vector for the L1 pseudorange measurement or the L2 pseudorange measurement, derived from a partial derivative of a measurement equation with respect to modeled states; and
    forming observation noise for the L1 pseudorange measurement or the L2 pseudorange measurement, accounting for expected GPS pseudorange white noise and multipath.

13. The method of claim 12, wherein the modeled states include position, clock bias, pseudorange bias, and the ionospheric error.

14. The method of claim 12, further comprising:
- after a clock bias initialization, performing a measurement residual test by comparing expected measurement variance with actual residual; and
- for all measurements that pass the residual test, updating a state vector, a U matrix, and a D vector using a UD measurement update algorithm.

15. The method of claim 10, wherein for each visible satellite with valid L1 or L2 accumulated carrier phase measurements, the extended Kalman filter performs a process comprising:
- forming a range vector from an antenna to the satellite;
- forming a magnitude of the range vector;
- forming a unit vector to the satellite;
- forming an expected GPS measurement from the magnitude of the range vector and a current clock bias;
- forming a GPS measurement residual by subtracting the expected GPS measurement from the L1 accumulated carrier phase measurement or the L2 accumulated carrier phase measurement;
- forming a sensitivity vector for the L1 accumulated carrier phase measurement or the L2 accumulated carrier phase measurement, derived from a partial derivative of a measurement equation with respect to modeled states for L1 or L2 accumulated carrier phase measurements; and
- forming observation noise for the L1 accumulated carrier phase measurement or the L2 accumulated carrier phase measurement, accounting for expected GPS pseudorange white noise.

16. The method of claim 15, wherein the modeled states for L1 accumulated carrier phase measurements include position, clock bias, pseudorange bias, L1 accumulated phase offset, and the ionospheric error.

17. The method of claim 15, wherein the modeled states for L2 accumulated carrier phase measurements include position, clock bias, pseudorange bias, L2 accumulated phase offset, and the ionospheric error.

18. The method of claim 15, further comprising:
- after a clock bias initialization, performing a measurement residual test by comparing expected measurement variance with actual residual; and
- for all measurements that pass the residual test, updating a state vector, a U matrix, and a D vector using a UD measurement update algorithm.

19. A computer program product, comprising:
- a non-transitory computer readable medium including instructions stored thereon executable by a processor to perform a navigation method comprising:
  - receiving navigation satellite measurement data from one or more navigation satellites, the satellite measurement data including L1 pseudorange measurements, L2 pseudorange measurements, L1 accumulated carrier phase measurements, and L2 accumulated carrier phase measurements;
  - receiving inertial measurement data from one or more inertial sensors;
  - processing the satellite measurement data with the inertial measurement data in an extended Kalman filter, wherein the extended Kalman filter models a range bias for ionospheric error; and
  - generating an absolute navigation solution based on the processed satellite measurement data and inertial measurement data.

20. The computer program product of claim 19, wherein the method further comprises:
- receiving inertial navigation state conditions data; and
- generating an integrated inertial navigation solution state transition matrix in the extended Kalman filter.

* * * * *